Dec. 27, 1927.
I. O. G. DROLSHAMMER
1,653,842
BRAKE VALVE
Original Filed July 22, 1922   2 Sheets-Sheet 1
Fig. 1.
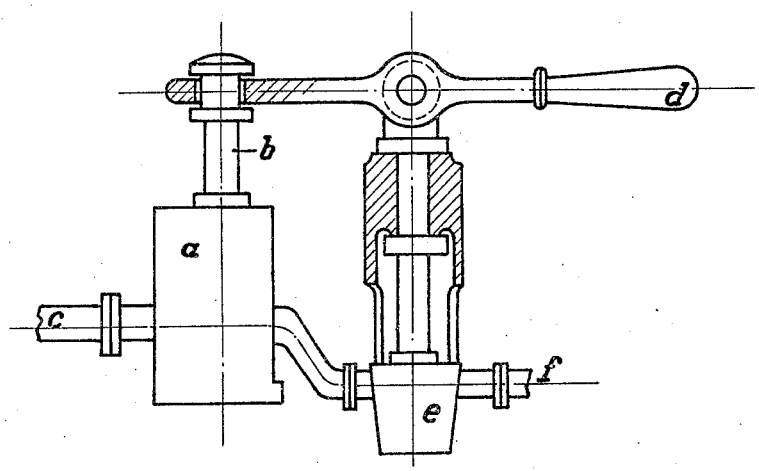
Fig. 2.   Fig. 3.   Fig. 4.
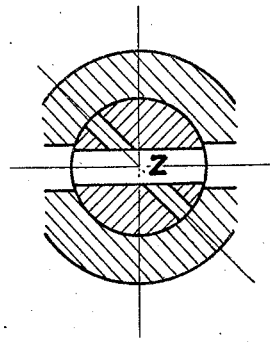 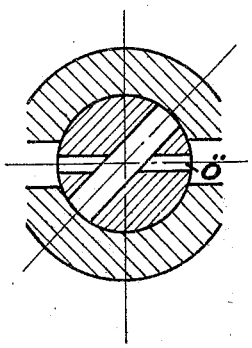 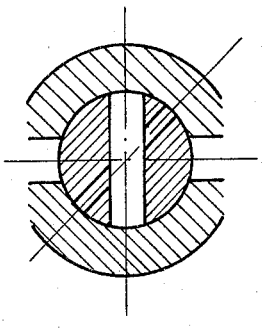
Inventor:
IVAR OLAF GEORG DROLSHAMMER,
by Arthur Middleton
Atty.

Dec. 27, 1927.
I. O. G. DROLSHAMMER
1,653,842
BRAKE VALVE
Original Filed July 22, 1922      2 Sheets-Sheet 2
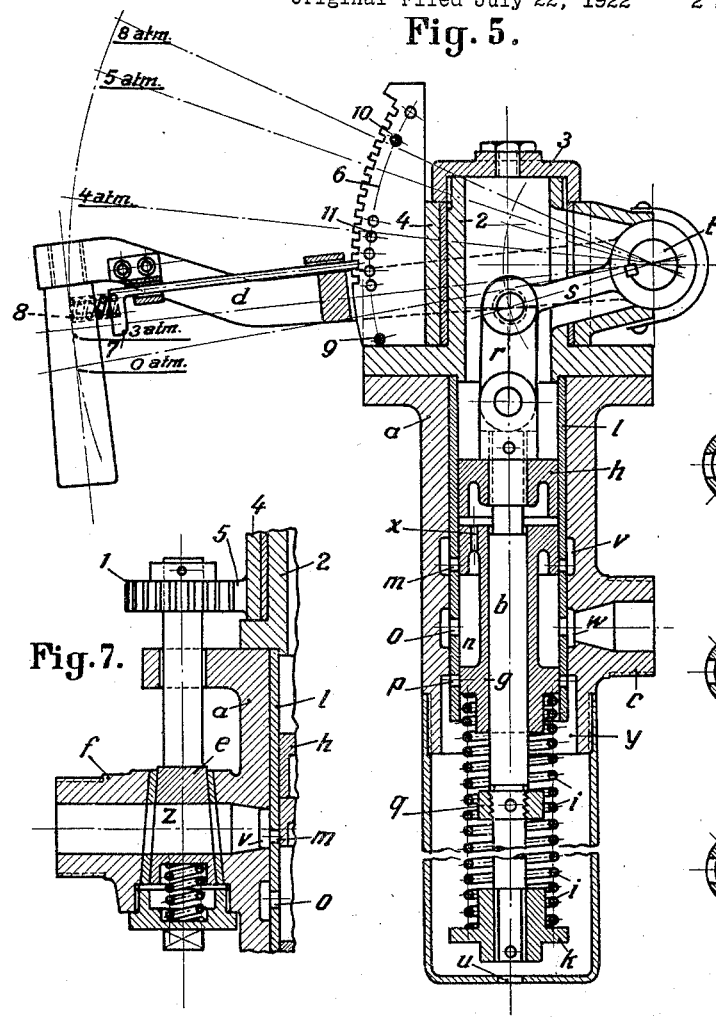
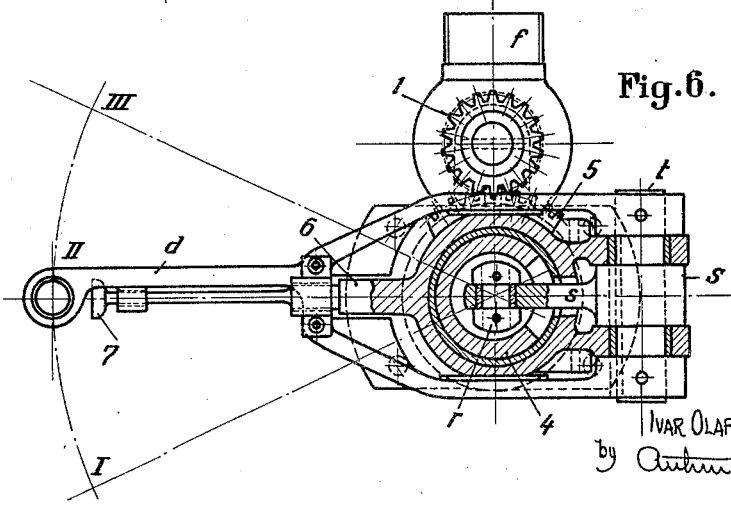
Inventor:
IVAR OLAF GEORG DROLSHAMMER,
by Arthur Middleton
Atty Patented Dec. 27, 1927.

1,653,842

UNITED STATES PATENT OFFICE.

IVAR OLAF GEORG DROLSHAMMER, OF HAMAR, NORWAY.

BRAKE VALVE.

Application filed July 22, 1922, Serial No. 576,892, and in Germany April 8, 1921. Renewed October 14, 1927.

The present invention relates to improvements in driver's brake valves for regulating the action of the compressed air brakes used by railway trains, engine cars and the like. The object of this driver's brake valve among other things, is to regulate the air pressure in the brake so that it corresponds to the brake action wanted. By the known constructions of drivers' brake valves, this object is obtained by the locomotive driver through instinctive adjustment of the stop and regulating cock of the driver's brake valve allows enough air to pass out of the main air pipe or to pass into the pipe from the main air receiver (in which there is a constant higher pressure than in the main pipe) until the necessary pressure in the main pipe for obtaining the necessary brake action is obtained.

The pressure in the main air pipe is controlled by means of a manometer and is regulated by allowing the compressed air to pass alternately in and out. According to the degree of leakiness, which is dependent on the length of the train and on the state of the braking devices, the engine driver must operate the cock correspondingly in order to maintain a sufficient high pressure. By the known drivers' brake valves, it is not possible to adjust automatically and maintain the pipe pressure constant during the braking, so the regulating of the pipe pressure is made by the engine driver, who, as before stated, instinctively allows the compressed air to pass in and out alternately.

This method of adjustment of the pressure requires the driver to be very skillful and attentive, and therefore under certain circumstances is a great danger to the safety of railway traffic because the engine driver must divide his attention between the control of the manometers of the main air pipe, the boiler, the adjustment of the engine on one side, and the observation of the signals and the length conditions on the other side.

The known drivers' brake valves also have the disadvantage that in the main air pipe an increased pressure above the normal pressure of 5 atmospheres can easily arise, which is strictly forbidden as it badly affects the brake (see for instance, the official service directions for the Westinghouse brake and the Kunze-Knorr brake). An increased pressure in the main air pipe by normal traffic cannot be avoided, as has been shown by demonstration-experiments.

By the known drivers' brake valves, for instance, of the Westinghouse type, a pipe regulator is used, which, when the regulating cock is in driving position and with the brake released, maintains constant the normal pipe pressure of five atmospheres. Consequently, only the normal pipe pressure of five atmospheres is regulated and that only when the regulating cock is in driving position. In each other position the regulating does not act. Therefore, the above disadvantages are present.

The operating of the known drivers' brake valves also is circumstantial, as the regulating cock according to the necessity must be brought into the following positions:

1. Filling and releasing position.
2. Driving position.
3. Closing position.
4. Driving braking position.
5. Emergency braking position.

The present invention which relates to a driver's brake valve, is very simple compared with the valves heretofore known and the invention has for its object to facilitate the adjustment of the necessary pressure in the main air pipe and to prevent the pressure from being excessive or from being exhausted when this has not been intended. According to the invention, this is obtained by having the pressure in the main air pipe influenced by a pressure regulating device which automatically regulates the volume of air passing in and out in such a manner, that each position of the operating lever or the like for the driver's brake valve always corresponds to a certain pressure in the main air pipe. The other adjustments and changes of the air channels respectively, which are necessary in order to obtain the regular operation of a compressed air brake device, are the usual adjustments, namely, the adjustment of (1) the filling position, (2) driving position, (3) the closing position, and these are obtained by moving the operating lever in a different plane. Each of the two movements taking place in the different planes, is independent of the other. In order to prevent the pressure in the main air pipe from being maintained constant by the pressure regulator when the emergency brake cock is operated, the device is so constructed that in driving position, the air can pass into the pressure regulator only through a narrow channel which is wide enough to allow the air,-due to the normal leakiness, to pass therethrough, the channel, however, on the other side being so narrow that the pressure in the main air pipe is reduced and the emergency braking action takes place by opening the emergency brake cock, in spite of the pressure regulator.

In order to remove certain other disadvantages from existing constructions of driver's brake valves, the moving space of the operating lever according to this invention is limited in such a manner that a certain maximum pressure and a certain minimum pressure in the main air pipe cannot be exceeded whereby an excessive pressure in the main air pipe or an exhaustion of the braking force is prevented, also the greatest braking force admits a sufficient volume of air automatically when the pressure in the main air pipe is reduced owing to leakiness in the braking devices, etc.

With the new compressed air brakes having one chamber of the present invention, an excessive pressure in the main air pipe above the normal pressure of five atmospheres has no bad effect as was hitherto the case, which is desirable when driving down hill because by an excessive pressure in the main air pipe and in the auxiliary air receiver the action of the brake is considerably improved without influencing the braking force, etc., in the least. This follows because the pressure in the auxiliary air receiver does not act on the brake regulating valve, as is the case in prior constructions. Therefore, the object of the present invention is to allow an excessive pressure in the main air pipe, when in the present case this is desirable and to allow a sudden, complete exhaustion of the main air pipe when this happens to be desired.

Railroads permit that the maximum braking force on a freight car exist for a much longer time (braking time) than on a passenger or express train car. This is caused by different couplings, buffers, springs, etc. These parts are much stronger and better and heavier constructed than in freight cars. Therefore, it is necessary to make the braking time on a freight car considerably longer than on a passenger car, in order to prevent the train from being pulled apart. With the present Westinghouse brakes, the braking time for a passenger train brake according to official reports is about six seconds and for a freight car brake about thirty-five seconds.

The present invention has for its object to remove the necessity of adjusting each brake regulating valve in the whole train, by having the valve of this invention so constructed that the times for reduction and increase of the pipe pressure can be adjusted by hand as desired and that the areas of the outlet channel of the driver's brake valve and of the inlet channel of the main air pipe and the inlet channel to the driver's brake valve respectively can be adjusted by hand as desired as well as to correspond to the length of the train. Thus different braking times can readily be obtained in the brake regulating valves for they determine the braking time which is dependent on the pressure variation and on the time in which the variation is taking place.

For regulating the inlet and outlet speeds of the driver's brake valve there are placed throttle devices of a suitable construction in the inlet and outlet channels of the driver's brake valve, which throttle devices collectively or separately can be operated by hand.

The invention also has for its object to effectively brake an unloaded train without adjusting each brake regulating valve correspondingly, which is necessary by the brakes hitherto known. This is obtained by having the moving space for the operating lever for the driver's brake valve limited by means of a stop device of a suitable construction, for instance a screw, a tap or the like, so that a reduction of the normal pipe pressure, say of only 0.85 atmosphere, corresponding to a brake pressure of say 1.5 atmospheres, can be obtained, instead of as in loaded cars where a reduction of the pipe pressure of 1.5 atmospheres corresponds to a brake pressure of 3.5 atmospheres.

Thus the same results are obtained as by using vacuum brakes by which in an unloaded train, the vacuum is reduced from about 60 cm. to about 30 cm., whereby the braking force, without adjustment of the brake regulating valves, is correspondingly reduced. This generally is considered as a very great advantage over the compressed air brakes. The present invention however, makes the same possible with compressed air brakes which have the great advantage that they are acting with a much higher pressure than the vacuum brakes.

In the accompanying drawings are shown, diagrammatically, several manners of carrying out the invention.

Figure 1 shows diagrammatically one arrangement of the driver's brake valve;

Figs. 2, 3 and 4 show different positions of the closing device.

Figs. 5, 6 and 7 show a special manner of execution or modification of the invention, Fig. 5 showing the driver's brake valve in section, Fig. 6 a plan view of the same, partly in section on the upper part, and Fig. 7 a side view of a part of the same in section, vertically on the section in Fig. 5.

Figs. 8, 9 and 10 are horizontal sectional views showing the cock $e$ in different operating positions, namely, Fig. 8 shows the cock $e$ when its operating handle or valve $d$ is in the position I indicated in Fig. 6; Fig. 9 shows the cock $e$ when its operating valve is in the position II indicated in Fig. 6; and Fig. 10, shows the cock $e$ when its operating valve is in the position III indicated in Fig. 6.

In the arrangement of the driver's brake valve shown as an example in Fig. 1, $a$ is a pressure regulator of a suitable known construction, which regulator by means of a membrane or a spring loaded valve automatically adjusts and maintains a certain pressure in the pipe $c$ corresponding to the adjustment of the rod $b$. This rod is moved by moving the operating lever $d$ in the plane of the drawing. In or on the pressure regulator a closing device $e$ is provided, which is operated by moving the lever $d$ perpendicularly on the plane of the drawing.

Fig. 2 shows the filling position (the operating position) with the wide opening $z$. Fig. 3 shows the driving position with the narrow opening $ö$, and Fig. 4 shows the closing position. The device is arranged in such a manner, that these three different positions can be adjusted in the above said succession.

By means of a device (not shown) for limiting the stroke of the rod $b$ or of the parts attached to said rod, the air pressure in the main air pipe will not be reduced below a certain degree.

Figs. 5, 6 and 7 show a special manner of execution or modification of the invention. Fig. 5 showing the driver's brake valve in section, Fig. 6 a plan view of the same, partly in section on the upper part, and Fig. 7 a side view of a part of the same in section, vertically on the section in Fig. 5.

The driver's brake valve consists of a balancing piston $h$ with a rod $b$ provided with a spring stop $k$, which rod $b$ can be adjusted by means of the link $r$, the lever $s$, the bolt $t$ and the lever $d$. Slidably on the piston rod $b$ is arranged a regulating piston valve $g$, which is provided with a hollow portion $n$ and a channel $x$. Between the stop $k$ and the regulating piston valve $g$ a spring $i$ is provided, which regulates the pressure in the main air pipe corresponding to the adjustment of the balancing piston $h$, and which is slightly tensioned by the lowest pipe pressure completely tensioned by the maximum pipe pressure. These devices are mounted in a case $a$, which is provided with an inlet $f$, a pipe outlet $c$, an outlet $u$ and the hollow portions $v$, $w$, $y$. In the case $a$ is mounted a cylindrical slide jacket $l$, which is provided with the inlet channels $m$, $o$ and the outlet channels $p$. The driver's brake valve also is provided with a closing cock $e$ with the wide opening $z$ and the narrow opening $ö$, further with a small toothed wheel 1, with a casing 2, which is screwed to the case $a$ and is provided with the lid 3, and with a cylindrical member 4, which is provided with the toothed segment 5 and toothed rib 6, and on which member the operating lever $d$ is rotatably mounted.

This operating lever is provided with an attaching device 7, which under influence of the spring 8 engages with the toothed rib 6. The rib is provided with two displaceable stops 9 and 10 which are attached in the holes 11.

The action of the driver's brake valve is as follows:

When the operating lever $d$ is brought by the engine driver into the position shown in Figs. 5 and 6, the compressed air passes from the main air receiver on the locomotive, in which receiver a constant pressure, of, for instance, 8 atmospheres, is maintained, through the inlet $f$ and the opening $ö$ in the closing and regulating cock $e$; further through the hollow portion $v$ in the case $a$ and the channels $m$ in the slide jacket $l$, which channels are opened by the regulating piston valve $g$; further through the hollow portion $n$ in the valve $g$; through the channels $o$ in the slide jacket $l$; and through the hollow portion $w$ to the outlet $c$, which is connected to the main air pipe. The compressed air passes into the main air pipe during such time and the pressure in the pipe has reached, for instance, three atmospheres. Thereafter the pipe pressure, which, owing to the channel $x$ also in the space between the regulating valve $g$ and the balancing piston $h$, displaces the regulating piston downwards into its closing position, when the axial force acting on the regulating valve owing to the pipe pressure, has been equal to the tension in the spring $i$. This force does not cause any outer pressure on the piston rod $b$, as this is balanced by the pressure caused by the pipe pressure on the balancing piston $h$, said force only evinces itself as inner tension (tension in the material) in the rod $b$. When the engine driver moves the operating lever upwards also the balancing piston is moved upwards. The regulating piston $g$ follows this movement, as the air pressure always keeps the regulating piston in balance, the piston $g$ thereby opening the inlet channels $m$. Thus compressed air from the main air receiver on the locomotive again can pass for a time into the main air pipe until the pressure in the pipe has increased so much that the axial air pressure displaces the regulating valve back to its closing position, and when the axial force acting on the regulating valve owing to the increased pipe pressure has been equal to the higher tension caused in the spring

*i*. When the operating lever is brought almost in its upper position, the normal pressure of, for instance, five atmospheres is obtained in the main air pipe. When the operating lever is moved further upward as well the balancing piston *h* as also the regulating valve *g*, for instance, by 5.5 atmospheres pipe pressure are forced to move correspondingly, as the regulating valve will stop against the stop *q* on the piston rod *b*, whereby the spring *i* will not come into action. The compressed air in the main air receiver with a pressure of say 8 atmospheres is now unopposed can pass into the main air pipe through the inlets *m*.

When the operating lever *d* is again moved downward, the balancing piston *h* and the regulating valve *g* also are moving downward, and the said valve closes the inlets *m* and opens the outlet channels *p*. Then the air can pass out of the main air pipe until the reduced tension in the spring *i* exceeds the reduced pipe pressure, thereby displacing the regulating valve back into its closing position. When the operating lever *d* is moved further downward, the same operations are repeated, viz, each position of the operating lever *d* and the piston rod *b* respectively corresponds to a certain reduced pressure of the compressed air in the main air pipe.

When the lever *d* is moved from the position say for three atmospheres and further downward, the balancing piston *h* stops against the regulating valve *g*, whereby the spring *i* comes quite out of action, and as the regulating valve *g* has opened the outlet channels *p* the compressed air in the main air pipe can suddenly entirely exhaust.

When the operating lever *d* is turned in the other plane round the case 2, the previous adjustment of the operating lever remains unchanged, and by means of the toothed segment 5 of the member 4 the toothed wheel and the closing and regulating cock *e* are turned correspondingly. Fig. 8 shows the position of the cock *e* when the operating valve *d* is in the position I (see Fig. 6), viz, the filling and the operating position respectively with the wide opening *z* in action. Fig. 9 shows the same when the operating lever is in the position II, viz, the driving position with the narrow opening *ö* in action. Fig. 10 shows the same with the operating lever in the position III, viz, the closing position.

In order to maintain the operating lever *d* in each adjusted position in the regulation of the pipe pressure, the lever is provided with a common or usual stop device 7.

For regulation of the speed of the air passing into and out of the driver's brake valve, in the inlet and outlet channels as above said there can be provided throttle devices of a suitable construction, which devices jointly or separately can be operated by hand. These throttle devices, however, are not shown on the drawings owing to the fact that they form no part of this invention and are of usual construction.

In order to limit the movement of the lever *d* in the plane of the drawing, also as above said there are provided for instance, two displaceable stops 9 and 10 which can be attached in the holes 11 in the toothed rib 6.

Having thus described my invention, what I claim is:—

1. In combination in a railway train braking system, a compressed air reservoir, a main air pipe taking air therefrom, a driver's brake valve provided with a pressure regulator automatically regulating the air passing in or out of the main pipe, each position of the operating lever of the driver's brake valve in one plane corresponding to a certain pressure in the main pipe, said regulator being between the main air line and the regulator cock in the driver's brake valve, the adjustments necessary for the filling, driving and closed positions in the regular operation of a compressed air brake, being obtained by means of the regulator cock by moving the operating lever of the driver's brake valve in another plane.

2. In combination in a railway train braking system, a compressed air reservoir, a main air pipe taking air therefrom, a driver's brake valve provided with a pressure regulator automatically regulating the air passing in or out of the main pipe, each position of the operating lever of the driver's brake valve in one plane corresponding to a certain pressure in the main pipe, said regulator being between the main air line and the regulator cock in the driver's brake valve, the adjustments necessary for the filling, driving and closed positions in the regular operation of a compressed air brake, being obtained by means of the regulator cock by moving the operating lever of the driver's brake valve in another plane, said regulator cock of the said brake valve having a plurality of passages therethrough to give in the operating position a wide inlet opening, in the driving position a narrow inlet opening, and in the closing position no inlet opening to the pressure regulator.

3. In combination in a railway train braking system, a compressed air reservoir, a main air pipe taking air therefrom, a driver's brake valve provided with a pressure regulator automatically regulating the air passing in or out of the main pipe, each position of the operating lever of the driver's brake valve in one plane corresponding to a certain pressure in the main pipe, said regulator being between the main air line and the regulator cock in the driver's brake valve, the adjustments necessary for the filling, driving and closed positions in the regular operation of a compressed air brake, being obtained by means of the regulator cock by moving the operating lever of the driver's brake valve in another plane, with adjustable stops for limiting the movement of the operating lever or the like, whereby a predetermined pressure in the main air pipe is maintained, which point can be adjusted as desired.

4. In combination in a railway train braking system, a compressed air reservoir, a main air pipe taking air therefrom, a driver's brake valve provided with a pressure regulator automatically regulating the air passing in or out of the main pipe, each position of the operating lever of the driver's brake valve in one plane corresponding to a certain pressure in the main pipe, said regulator being between the main air line and the regulator cock in the driver's brake valve, the adjustments necessary for the fillcertain pressure in the main pipe, said regular operation of a compressed air brake being obtained by means of the regulator cock by moving the operating lever of the driver's brake valve in another plane, a regulating piston valve $g$ being pressed by the pipe pressure against a stop $q$ on the piston rod and by the tension of the spring $i$ against the balancing piston $h$ respectively, whereby the regulating piston valve is moved positively when the operating lever is moved outside the normal position.

5. In combination, in a railway train braking system, a compressed air reservoir, a main air pipe taking air therefrom, a driver's brake valve provided with a pressure regulator automatically regulating the air passing in or out of the main pipe, each position of the operating lever of the driver's brake valve in one plane corresponding to a certain pressure in the main pipe, said regulator being between the main air line and the regulator cock in the driver's brake valve, the adjustments necessary for the filling, driving and closed positions in the regular operation of a compressed air brake, being obtained by means of the regulator cock by moving the operating lever of the driver's brake valve in another plane, the operating lever ($d$) being mounted in a movable member (4), which is provided with a toothed rib or the like, and a stop device (7) for the operating lever when the pipe pressure is regulated, the lever ($d$) being pivoted on the bolt ($t$) in the member (4) while this member (4) is rotatable round the case (2), which is perpendicular on the bolt ($t$) whereby independently of the first regulation of the pipe pressure, it is possible to make the necessary adjustments of (1) the filling and operating position respectively, (2) the driving position, and (3) the closing position for the closing device ($e$) by movement of the operating lever ($d$) in another plane perpendicular to the first mentioned plane.

6. In combination in a railway train braking system, a compressed air reservoir, a main air pipe taking air therefrom, a driver's brake valve provided with a pressure regulator automatically regulating the air passing in or out of the main pipe, each position of the operating lever of the driver's brake valve in one plane, corresponding to a certain pressure in the main pipe, said regulator being between the main air line and the regulator cock in the driver's brake valve, the adjustments necessary for the filling, driving and closed positions in the regular operation of a compressed air brake, being obtained by means of the regulating cock by moving the operating lever of the driver's brake valve in another plane, said regulator cock of the said brake valve having a plurality of passages therethrough to give in the operating position a wide inlet opening, in the driving position a narrow inlet opening, and in the closing position no inlet opening to the pressure regulator, the times for reduction and increases of the pipe pressure being regulated according to the conditions, i. e., for express trains shorter, and for goods trains longer, by adjusting the areas of the outlet and inlet openings of the driver's brake valve by hand, thus rendering the otherwise necessary adjustments of the brake regulating valves on the single cars unnecessary.

In testimony whereof I affix my signature.

IVAR OLAF GEORG DROLSHAMMER.